Aug. 28, 1934.  C. BRYKCZYNSKI ET AL  1,971,744
PORTABLE RACK
Original Filed Sept. 11, 1931
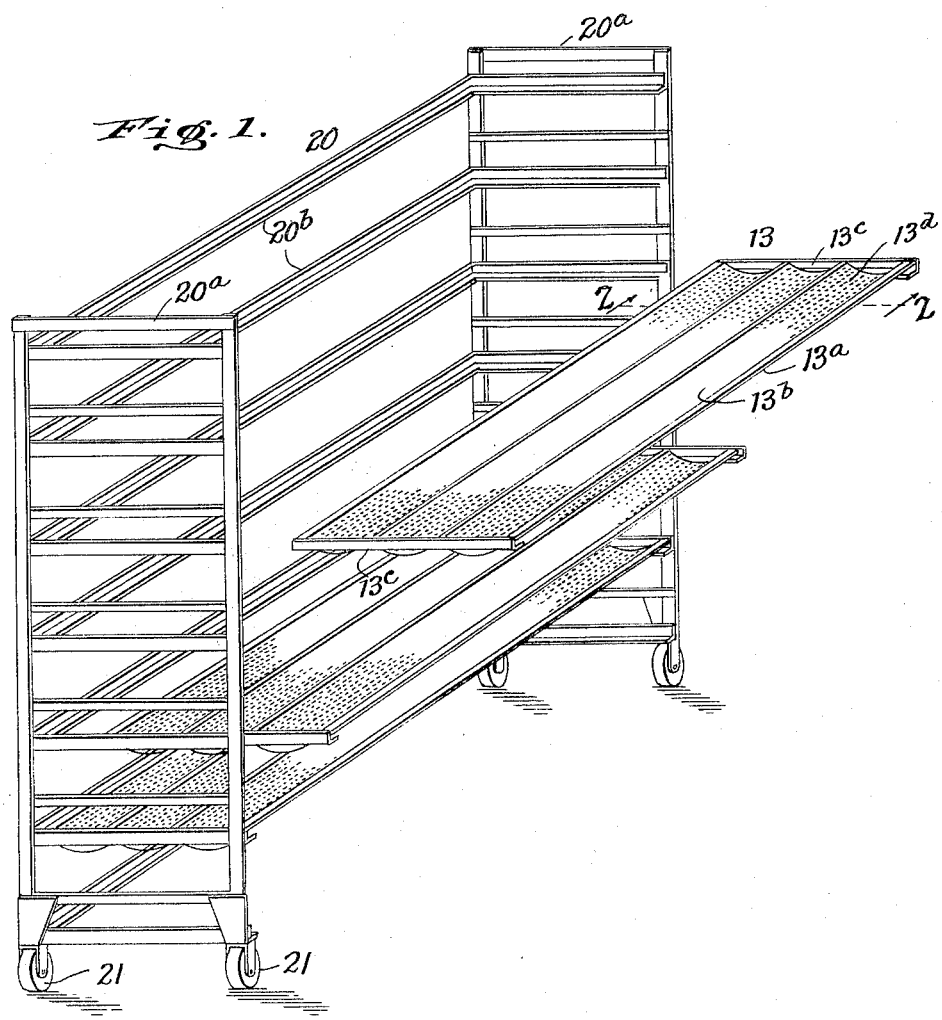
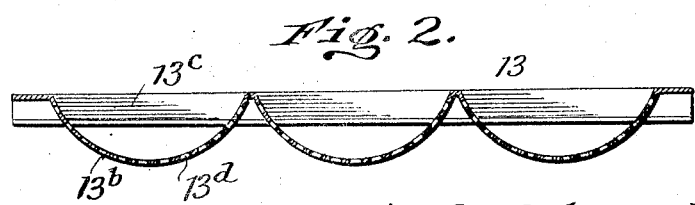
Charles Brykczynski
Julius Chmurzynski } Inventors
By H. T. Byrne
Attorney Patented Aug. 28, 1934

1,971,744

UNITED STATES PATENT OFFICE 1,971,744

PORTABLE RACK

Charles Brykczynski and Julius Chmurzynski, New York, N. Y., assignors to Geo. F. Stuhmer & Company, New York, N. Y., a corporation of New York Original application September 11, 1931, Serial No. 562,298. Divided and this application October 10, 1932, Serial No. 637,142

1 Claim. (Cl. 211—143)

The present invention relates to loading and delivery means for bakery products or the like and forms a part or division of our application for U. S. patent on "Delivery and loading means for bakery products or the like", Patent No. 1,882,238, dated October 11, 1932.

In the delivery of such products from the bakery to the consumer, rapid and hygienic loading thereof into the delivery wagon is essential. Furthermore, for efficient delivery, the wagons themselves must be so constructed as to permit loading to full capacity. It is also essential that the wagon structure be such that the products can be handled in sanitary manner and that there be, therefore, ready access to all parts of the wagon interior both when the latter is loaded and unloaded.

Heretofore it has been customary to store bakers' products in boxes, baskets or the like and placing the same on shelves or the like in the wagon, which for the purpose of ready access have been made collapsible or of the interlocking type. But such method and structure having been found to be objectionable for many reasons, particularly unwieldly and inefficient.

More particularly the present invention pertains to the novel construction of apparatus to provide special holders or collectors for the bakery products, designed particularly for the convenient, sanitary and efficient handling of bread loaves, or the like.

With the above and other objects in view, our invention comprises the novel construction, combination and arrangement of elements to be hereinafter more fully described and shown and defined in the appended claim.

The invention is shown by way of illustration in the accompanying drawing, wherein:

Figure 1 is a perspective view of the support or rack for transporting a plurality of collectors or troughs; and, Figure 2 a cross-section of one of the troughs taken on line 2—2 of Figure 1.

Referring to the construction in further detail the collectors 13 are in form of trays or troughs preferably of the shape shown, i. e. consisting of an elongated rectangular frame 13$^a$ and an undulated or corrugated supporting surface or bed 13$^b$ divided by the undulations longitudinally into several concaved compartments which in cross sections are adapted to substantially conform with the shape of a loaf of bread or the particular product for which it is to be used so that the latter may be conveniently stored in adjacent longitudinal rows in the said collector or trough 13.

It will be noted that the pieces 13$^c$ of the frame 13$^a$ project beyond the lowermost point of the depression of each compartment and thus form rests or stops for the products at the front and rear ends of the troughs.

When unloaded the troughs can be placed on top of one another, the concave compartments of the superposed troughs engaging one another. And for the purpose of permitting air circulation the sheet metal or surface portion 13$^b$ may be perforated as at 13$^d$. These troughs 13 when loaded with the products can be placed into the wagon like shelves to be supported on each pair of opposite iron bars or runways 12 and adjusted to lie adjacent to one another in horizontal rows extending throughout the length of the inner space of the delivery wagon, as disclosed in our U. S. patent, No. 1,882,238, dated October 11, 1932.

The several sets or rows of troughs will be thus positioned in superposed manner slidably and removably bearing in shelf-like manner on the superposed pairs of runways arranged in the vehicle; and in order to facilitate the shifting of the troughs within the wagon from an upper pair of runways to a lower one and vice versa and thus afford easy access to or quick delivery of the product stored on a particular trough without the necessity of removing other troughs from the wagon the novel construction within the wagon is employed. See our patent, No. 1,882,238, dated October 11, 1932.

To transpose these troughs in the wagon on the different runways the door sections need not be removed but one or the other may be merely shifted from one side to the other, as disclosed in said patent. For the transport of the troughs from the oven or baking room to the wagon a portable rack 20 supported on wheels 21 is employed. This rack comprises a U-shaped frame formed of two end pieces 20$^a$ connected by a set of vertically superposed U-shaped angle bars 20$^b$ fixed thereto and which form supports or shelves for the troughs 13. These troughs are adapted to be positioned on and removed from said shelves through the open side of said rack and to bear on the shelves thereof with their end edges and one side edge. A removable stanchion or post is mounted at the rear of the wagon which serves to prevent the loaded troughs from slipping out of the wagon when the latter is loaded.

The use of our device is as follows:

The breads or other bakery products as they come from the oven are stacked on the troughs or collectors 13 and the latter are placed upon the portable rack 20. The loaded rack is then rolled from the baking room to the delivery wagon. Here the troughs are individually removed from the racks and mounted on the respective pairs of angle bars in the wagon, first on the lower pair, then on the second pair, etc., until the entire wagon is filled. To load on the lower pair of angle bars in the front part of the wagon movable sections are swung open and the trough lowered through the gap onto the lower pair of angle bars.

When arriving at a delivery point, the troughs to be delivered are individually removed from the wagon, emptied into the consumer's receptacle and replaced in the wagon. By reason of this construction loaded troughs may be slipped over and rest in unloaded ones.

The movable sections in the wagon permit troughs to be shifted from one set of runways to another within the truck without removing them from the latter. This affords the deliverer great ease of manipulation and facility of adjustment of the load as well as ready access to any particular trough.

The rack in width, height, and in the spacing and number of shelves thereof may be made to exactly correspond with the inner width and height of the vehicle and spacing and number of runways therein, so that the rack may be brought up close to the opened rear end of the vehicle and the troughs shoved from the rack onto the runways of the vehicle thereby avoiding the lifting of the troughs from the shelves of the truck and greatly facilitate loading.

It is obvious that various modifications may be made in the construction of the device without departing from the spirit of our invention and we therefore do not wish to restrict ourselves to the details of the construction described and shown.

What we claim is:

A portable bread carrying rack comprising four upright bars, cross members connecting said upright bars and forming rectangle end frame structures; a plurality of lateral angle bars along three sides and connecting said end frames into a unitary structure, said angle-bars arranged in super-posed relation and providing lateral supporting ledges and vertical abutting elements, rectangular frames having angle-bars at the ends thereof providing ledges adapted to have sliding and supporting engagement with the ledges of the angle bars of the rack, the ledge portions of said frames lying in intimate contact with the ledges of the angle-bars at the ends of the frame structure; the angle-bars at the side of the rack providing abutting elements for said frames, and trough-like and perforate sheets mounted on and extending lengthwise of said frames and providing bread holding trays, substantially as set forth.

CHARLES BRYKCZYNSKI.
JULIUS CHMURZYNSKI.